March 20, 1962 H. GURVIS 3,026,237
HEAT AND PRESSURE SEALING PRESS
Filed Aug. 7, 1959 4 Sheets-Sheet 1

INVENTOR
HENRY GURVIS

BY MAHONEY, MILLER & RAMBO, ATTY'S
BY *Wm. V. Miller*

March 20, 1962     H. GURVIS     3,026,237
HEAT AND PRESSURE SEALING PRESS
Filed Aug. 7, 1959     4 Sheets-Sheet 2

*INVENTOR.*
HENRY GURVIS
BY MAHONEY, MILLER & RAMBO,
ATTY'S.

March 20, 1962 H. GURVIS 3,026,237
HEAT AND PRESSURE SEALING PRESS
Filed Aug. 7, 1959 4 Sheets-Sheet 3

INVENTOR.
HENRY GURVIS
BY MAHONEY, MILLER & RAMBO
ATTY'S

INVENTOR.
HENRY GURVIS
BY MAHONEY, MILLER & RAMBO,
ATTY'S.

United States Patent Office 3,026,237
Patented Mar. 20, 1962

3,026,237
HEAT AND PRESSURE SEALING PRESS
Henry Gurvis, Columbus, Ohio, assignor to Crown Auto Top Manufacturing Company, Columbus, Ohio, a partnership
Filed Aug. 7, 1959, Ser. No. 832,182
15 Claims. (Cl. 156—365)

This invention relates to a heat and pressure sealing press. It has to do, more particularly, with a press in which heat and pressure is developed for sealing overlapping edges or seams of plastic fabric such as is used in making convertible automobile tops. This type of press employs electronic heating means actuated by high frequency radio waves which act on the molecules of the fabric to cause heating from within the material. This type of heating with the simultaneous application of pressure results in a waterproof welded seam in which the layers of fabric are permanently bonded.

In sealing the seams or overlapping edges of convertible tops with presses of this nature, it has been difficult to locate the work with the seam properly positioned between the shoes or platens of the press and to retain the work in such position during the heating and pressing operation. This is especially true when the seam overlap is along an arcuate line which is true with most present-day convertible tops due to the crown desired in the top. The present invention provides means for initially locating the fabric material on one of the platens of the press so that the seam will be properly located thereon preparatory to heating and pressing, for smoothing the fabric out so that it will be pressed properly, and for mounting the fabric in such condition during heating and sealing. In conjunction with this work-locating and holding means, there are provided on the press guiding means to insure flat contact of the relatively movable platens and safety means to prevent injury to the hands of the operator or operators when initially positioning the fabric on the platen.

Various other objects will be apparent as this description progresses.

The accompanying drawings illustrate a heat and pressure sealing press embodying my invention.

Figure 1:
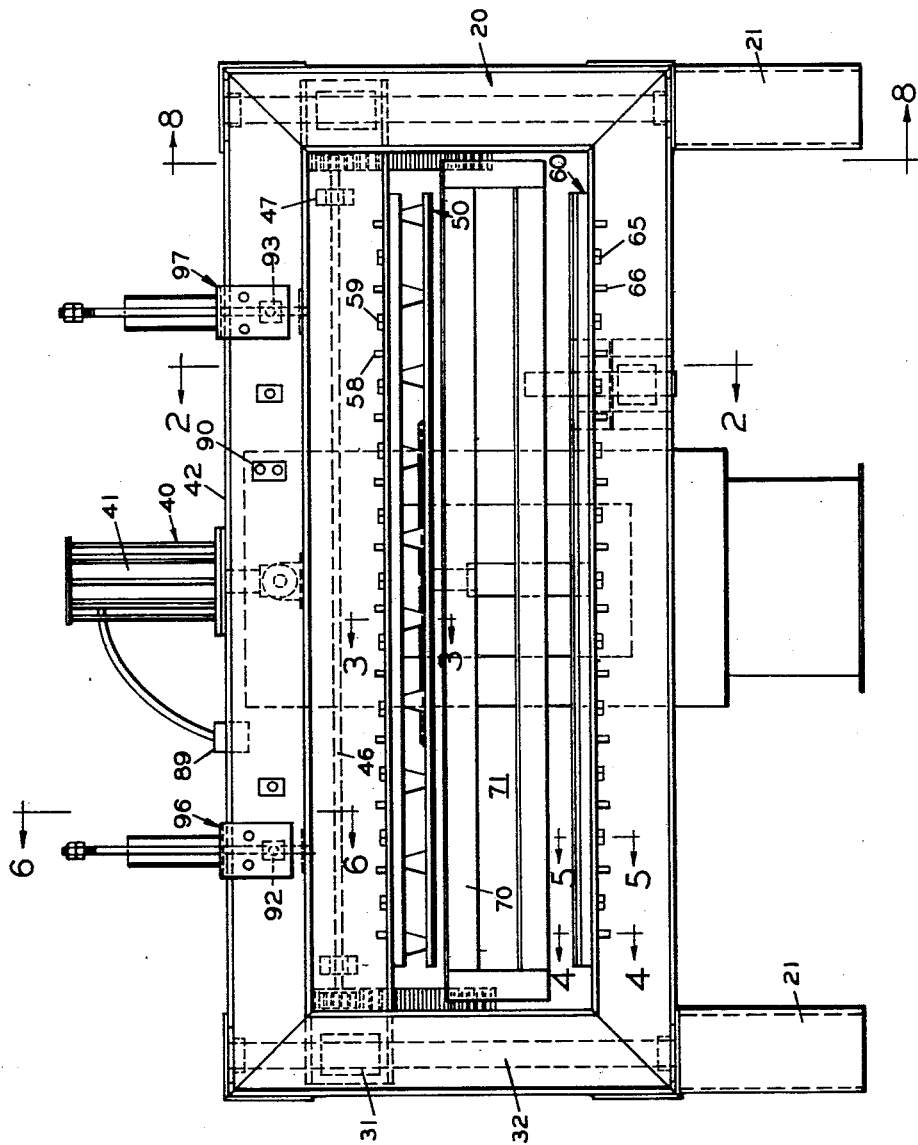
FIGURE 1 is a front elevational view of the press.
Figure 2:
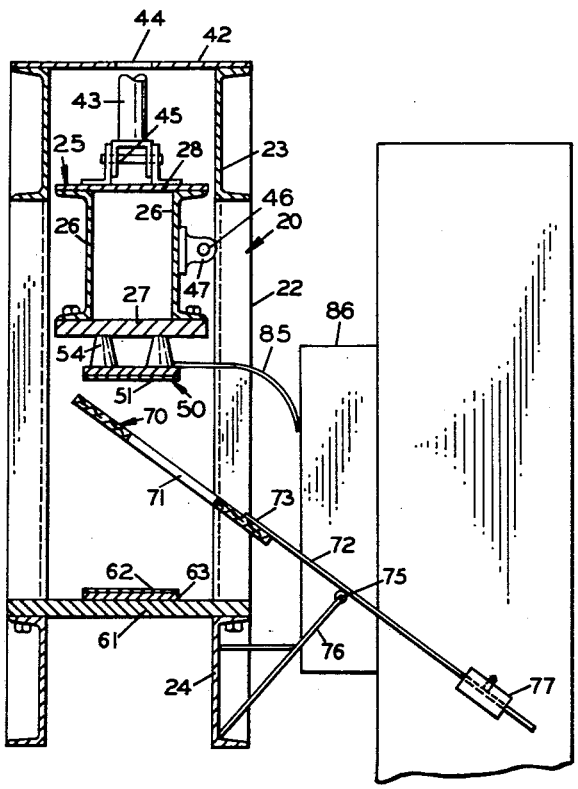
FIGURE 2 is a transverse vertical sectional view taken along line 2—2 of FIGURE 1 through the press.
Figure 3:
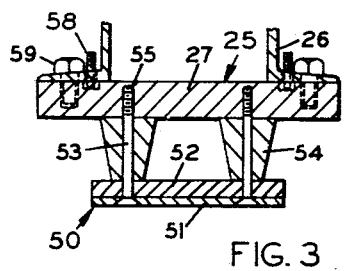
FIGURE 3 is a transverse vertical sectional view taken along line 3—3 of FIGURE 1 through the movable shoe or platen of the press and its support means.
Figure 8:
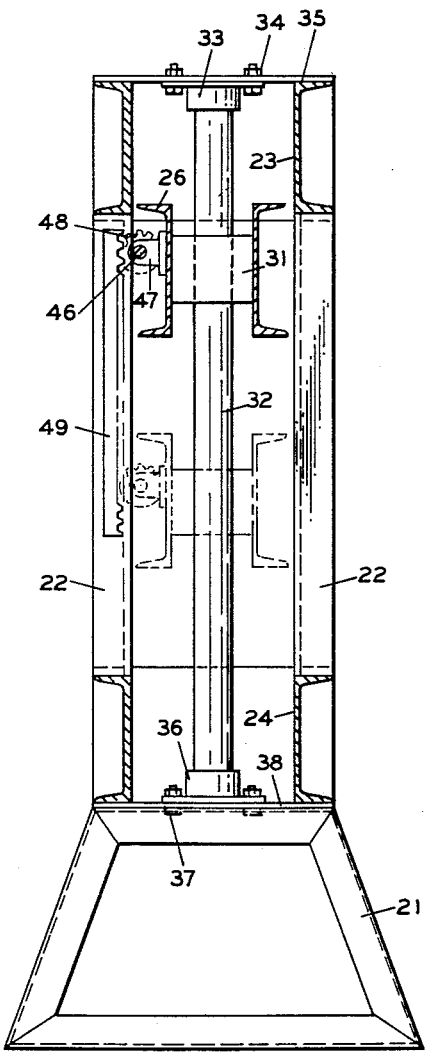
FIGURE 8 is a transverse vertical sectional view through the press taken along line 8—8 of FIGURE 1 showing means used to guide the supporting structure for the movable shoe and to keep it level during its vertical movement.

With reference to the drawings, FIGURES 1, 2 and 8 illustrate the general structure of a press in which this invention is embodied. The press includes a frame structure 20 of substantially rectangular form which is supported by a pair of base structures 21 at its opposite ends. The frame 20 is fabricated into a rigid rectangular structure from channel members that provide pairs of vertical columns 22 at each end, which carry a pair of upper supporting beams 23 and are attached to a pair of lower supporting beams 24 which, in turn, are carried by the base members 21. Mounted for vertical movement between the columns 22 is a shoe or platen carriage 25. This carriage 25, as shown in FIGURES 2 and 3, includes the main supporting beams 26 which are joined together by the platen-supporting plate 27 at their lower edges and by a plate 28 at its upper edges. Thus, in effect, the carriage 25 is a box girder.

The ends of the beams 26 project into the spaces between the columns 22 at the ends of the frame 20 for vertical movement therein as shown in FIGURES 1 and 8. In order to guide the carriage 25 in its vertical movement, a guide member 31 is disposed between the ends of the beams 26 at each end of the carriage 25. This guide member 31 has a vertical opening through which a vertically disposed guide rod 32 passes, the member 31 being adapted to slide vertically on the rod 32. The upper end of the rod 32 is received in a flanged socket member 33 which is bolted by bolts 34 to an upper horizontal plate 35 which is secured to the upper edges of the beams 23. The lower end of the rod 32 is received within a flanged socket member 36 which is bolted by bolts 37 to a lower horizontal plate 38 that is connected to the lower edges of the beams 24. Thus, when the carriage 25 is moved vertically, the rod guide structure at the ends of the carriage will guide its movement.

The vertical movement of the carriage 25 is accomplished with one or more vertically disposed fluid-actuated cylinder and piston units 40 shown in FIGURE 1. It is preferred that this unit 40 be pneumatically operated although hydraulic operation is also suitable. The cylinder 41 of the unit 40 is mounted in upright position and is supported by a plate 42 (FIGURE 1) which bridges the beams 23 and is rigidly secured to the upper edges thereof. The piston rod 43 of the unit 40 extends downwardly through an opening 44 in the plate 42 and is pivoted at 45 to the upper side of the carriage 25. Obviously, controlling the supply of fluid to and exhaust from the fluid-pressure unit 40 will control the vertical movement of the carriage 25 which will be guided by the guide rods 32.

In order that both ends of the carriage 25 will move vertically to the same extent, the press is provided with leveling means. This leveling means comprises a longitudinally extending shaft 46, shown in FIGURES 1, 2 and 8, which extends substantially the full length of the carriage 25. This shaft 46 is rotatably mounted in bearings 47 mounted on the rear supporting beam 26 of the carriage 25. Each end of the shaft 46 carries a rack gear 48, which is keyed on the shaft 46 and which meshes with an adjacent vertically disposed rack 49. Each rack 49 is attached in a fixed position to an adjacent column 22. As the carriage 25 moves vertically, the opposed rack gears 48 mesh with their cooperating fixed racks 49. Since both gears 48 are keyed on the same shaft 46, they will rotate to the same extent. Consequently, the carriage 25 will be maintained level at all times since both ends will be forced to travel to the same extent vertically as the fluid-pressure unit 40 is operated.

As indicated previously, the carriage 25 includes the platen or shoe-supporting plate 27 at its lower side and this plate extends almost the full length of the carriage. This plate 37 is adapted to carry a material-engaging platen 50. The platen is of flat rectangular form extending the length of the supporting plate 27 and embodies a face plate 51 of extreme smoothness or highly polished finish and a back-up plate 52, as shown in FIGURE 3. The plates 51 and 52 are secured beneath the plate 27 in spaced relationship thereto by means of bolts 53 passing through the plates and through the spacers 54, being threaded into the support plate 27 as at 55. Leveling screws 58 are threaded through the lower flange of each beam 26 into engagement with the upper surface of the plate 27 and cooperate with bolts 59, which pass through such flange and are threaded into the upper surface of the plate 27, to accurately level the plate 27 on its supporting carriage 25.

Figure 4:
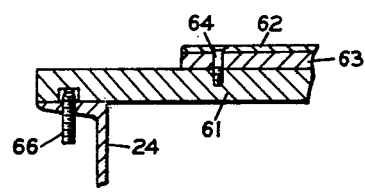
FIGURE 4 is a fragmentary transverse vertical sectional view taken along line 4—4 of FIGURE 1 through the fixed shoe or platen of the press and its support means.
Figure 5:
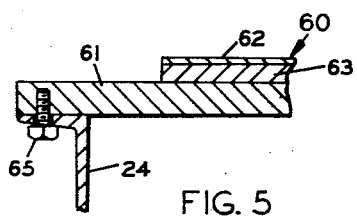
FIGURE 5 is a similar view but taken along line 5—5 of FIGURE 1 at a different location longitudinally of the fixed shoe and support.

The shoe 50 carried by the vertically movable carriage 25 is adapted to cooperate with a fixed shoe or platen 60 at the lower side of the frame 20 which is carried by a supporting plate 61 that is fixed to the upper edges of the lower support channel beams 24 of the frame structure. The manner in which the platen or shoe 60 is mounted is illustrated best in FIGURES 4 and 5. The shoe 60 comprises a material-contacting surface plate 62 of a highly-polished finish and a back-up plate 63. Both of these plates are bolted or otherwise secured to the support plate 61 by bolts 64. It will be noted best in FIGURE 1 that the shoe 60 is of a length slightly less than the opening in the frame structure 20. The shoe 50 on the carriage 25 is of a corresponding length. It will further be noted from FIGURE 9 that the shoe 60 is of rectangular outline and the shoe 50 is of corresponding outline. Thus, with the shoes 50 and 60 located in the same vertical plane as indicated, they can be moved into flat contact with each other by downward movement of the carriage 25. The support plate 61 is bolted to the beams 24 by the bolts 65 which extend upwardly through the upper flange of each beam and are threaded into the lower surface of the plate 61. Leveling screws 66 also extend up through such flange and into sockets on the lower surface of the plate 61.

Figure 10:
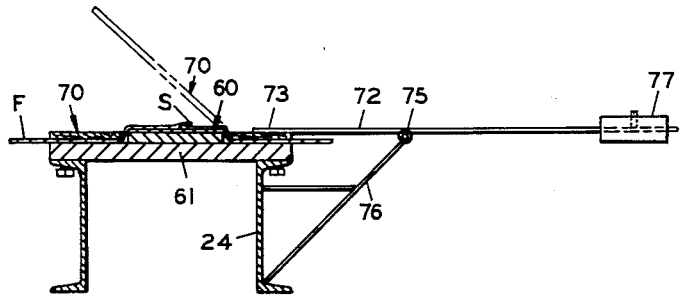
FIGURE 10 is a transverse sectional view taken along line 10—10 of FIGURE 9.
Figure 11:
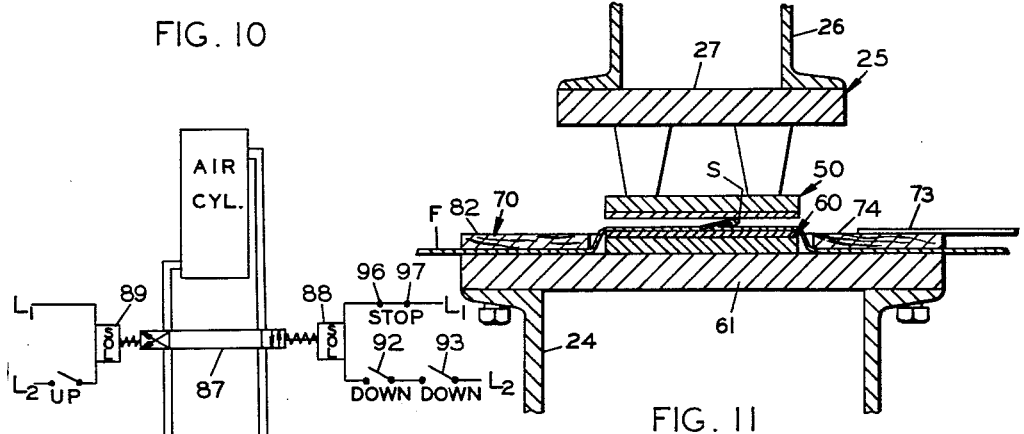
FIGURE 11 is an enlarged transverse vertical sectional view through the fixed shoe or platen and the work-holding frame associated therewith and through the movable shoe or platen which is shown just as it begins to contact the work disposed on the fixed shoe or platen.

In the use of the press, the flexible material F to be heated and pressed is applied over the lower shoe 60 as indicated in FIGURE 11. To initially locate the flexible material F in position on the shoe and to hold it there, a work or material-engaging frame 70 is provided which is shown in FIGURES 1, 2 and 9 to 11. This frame 70 is also of rectangular form and has a central opening or socket 71 of rectangular form for snugly receiving the shoe 60 when the frame is positioned downwardly thereover, as shown in FIGURE 11. The frame 70 is disposed between the upper movable shoe 50 and the lower fixed shoe 60 at all times. In its operative position, it will surround the shoe 60 but in its in operative position, it will be swung upwardly away therefrom as shown in FIGURE 2. However, downward movement of the carriage 25 from the position shown in FIGURE 2 will move the frame 70 into cooperative surrounding relationship with the shoe 60 at which time it will rest on the plate 61 which is of a total area at least as great as the area within the outer edges of the frame 70.

Mounting the frame 70 for this vertical movement, there is provided intermediate the ends thereof a supporting arm or frame 72. This arm 72 is rigidly connected at 73 to the rear longitudinally extending member 74 of the frame 70. This arm 72 is pivoted at 75 to the rear end of a supported 76 which extends upwardly and rearwardly from the rear lower beam 24 of the frame 20 to which is rigidly secured. A counterweight 77 is adjustably mounted on the lower end of the arm 72 and it is adjusted to such a position that it will normally swing the frame 70 upwardly about the pivot 75.

Figure 9:
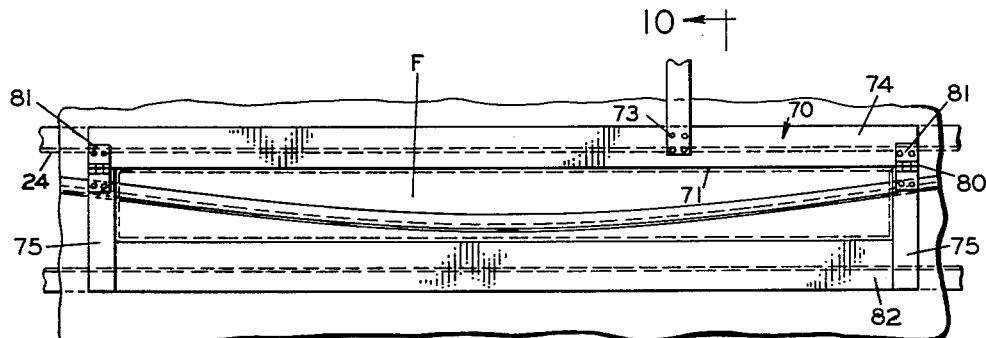
FIGURE 9 is a fragmentary plan view of a portion of the press showing the fixed shoe or platen with the work-locating and holding frame in cooperative relationship therewith.
Figure 9:
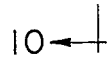

It will be noted from FIGURES 9 and 10 that the ends 80 of the frame 70 are hinged by hinge members 81 to the rear elongated member 74 of the frame. These hinges 81 will permit upward swinging of the ends 75 and the forward elongated member 82 of the frame 70 as a unit relative to the rear frame member 74. However, relative downward movement of the frame unit beyond the plane of the member 74 will be precluded.

Figure 12:
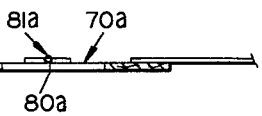
FIGURE 12 is a transverse sectional view illustrating a modification of the work-holding shoe.

In FIGURE 12 a slightly different arrangement of the frame 70a is provided. In this case the hinges 81a will be located intermediate the front and rear ends of the end members 80a so that the front half section of the frame 70a is hinged relative to the rear half-section thereof.

The electronic circuit for heating the material is of the usual type and includes a cable 85 (FIGURE 2) which connects to the shoe 50 and leads from a housing 86 on the frame 20 which encloses the heating circuit elements. This heating circuit may be controlled by a push-button switch 90 indicated in FIGURE 1.

Figure 13:
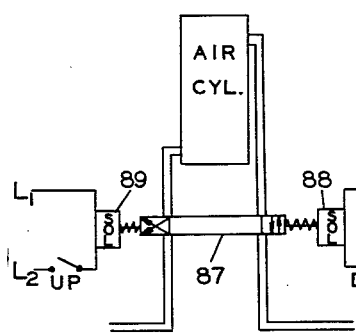
FIGURE 13 is a diagram illustrating a part of the electric and fluid control circuit of the press.

The fluid-pressure unit 40 is controlled by the usual four-way valve 87 which is indicated in FIGURE 1 and is shown diagrammatically in FIGURE 13. This four-way valve is controlled in its movements by two solenoids 88 and 89 which are connected in an electric circuit in series. Energizing the solenoid 88 actuates the valve 87 to lower the carriage 25. Energizing the solenoid 89 actuates the valve 87 to raise the carriage. The circuit for the solenoid 89 is controlled by a normally open switch 91 indicated in FIGURE 1. The circuit for the solenoid 88 is controlled by a pair of normally open safety switches 92 and 93 which are connected in series, these switches being indicated in FIGURE 1.

Figure 7:
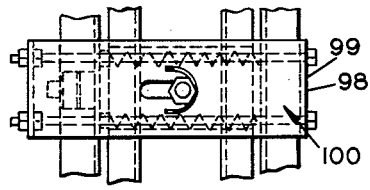
FIGURE 7 is a top plan view taken along line 7—7 of FIGURE 6.
Figure 6:
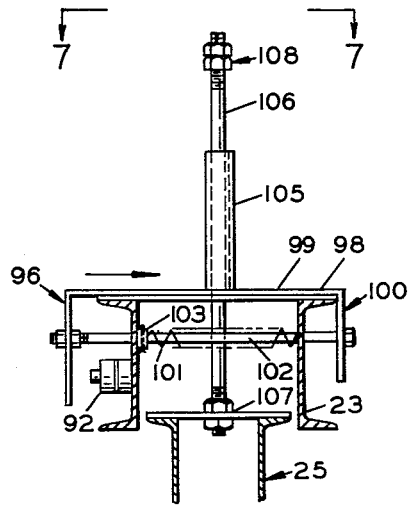
FIGURE 6 is a transverse sectional view taken along line 6—6 of FIGURE 1 showing a safety device on the press.

The switches 92 and 93 are of the push-button type and are mounted on the front upper beam 23 of the frame 20. They are associated with carriage stop units 96 and 97 which prevent downward movement of the carriage 25 unless both switches 92 and 93 are actuated. The machine is usually operated by two persons and unless each person pushes in the respective switch-actuating plates 98 and 99, the carriage 25 cannot be moved downwardly. Also, the units 96 and 97 prevent dropping of the carriage due to failure of the pressure system. The units 96 and 97 are shown best in FIGURES 1, 6 and 7.

Each plate 98 or 99 is part of a yoke member 100 (FIGURES 6 and 7) which straddles the upper beams 23. The member 100 is maintained in a forward position by a spring 101 on a rod 102 carried thereby, the rod being slidable in the beams 23 and the spring being between the beams. The spring 102 engages the rear beam 23 and a stop roller 103 fixed on the rod. In the normal forward position of the members 100, the plates 98 and 99 will not contact with the push-buttons of the associated switches 92 and 93. Each member 100 carries an upstanding stop member 105 of arcuate cross-section and vertically slidable within this member is a rod 106. The rod 106 slidably passes through an opening in the member 100, has its lower end bolted at 107 to the carriage 25 and has stop nuts 108 on its upper end. With the members 100 in normal position, the carriage 25 can only move downwardly slightly until the stop nuts 108 contact the upper ends of the upstanding stops 105. However, if both plates 98 and 99 are pushed inwardly to actuate switches 92 and 93, the stops 105 are moved out of the paths of the nuts 108 and the carriage 25 can move downwardly to the necessary extent to perform the pressing and heating operation.

In the use of the machine, the initial condition of the machine will be as shown in FIGURE 2 with the frame 70 swung upwardly away from the shoe 60. The fabric F, as shown in FIGURE 11, is placed on the shoe with the seam S to be heat-sealed in engagement therewith. Then, the carriage 25 is moved downwardly. The shoe 50 will engage the frame 70 in its downward movement and swing it downwardly over the shoe 60. This will pull the fabric downwardly around the shoe, as shown in FIGURES 11 and 10, and will retain it in the position shown in FIGURE 10. Anytime before the shoe 50 engages the fabric on the shoe 60, the forward part of the frame 70 can be swung upwardly to permit the operators to pull the fabric forwardly over the shoe 60, the rear part being held by clamping between the rear frame member 74 and the plate 61. The stop nuts 108 of the units 96 and 97 are so adjusted that the shoe 50 cannot move into clamping relationship with the shoe 60 during such an operation by the operators when their fingers might be between the shoes. However, if both plates 98 and 99 are pushed by the two operators, the shoe 50 can move into pressing relationship with the fabric F on the shoe 60. Then the electronic heating operation with the simultaneous pressing operation can be performed to heat-seal the seam S.

After the heat-sealing operation, if the switch 91 is actuated, the carriage 25 will rise. This will move the shoe 50 upwardly away from the shoe 60 and as the shoe 50 rises, the frame 70 will automatically swing upwardly, as indicated in FIGURE 2, until it strikes the shoe 50. Thus, the frame 70 is always positioned between the shoes or platens 50 and 60, and will be automatically moved between inoperative position (FIGURE 2) where it is spaced from the shoe 60 and operative position (FIGURE 11) where it surrounds the shoe.

It will be apparent from the above that this invention provides means for locating and holding the flexible material in proper association with the pressing and heating shoes or platens. It provides safety means for preventing movement of the shoes into pressing association, without each operator pushing his particular safety switch. Also, it provides means for ensuring that the movable shoe will always move into flat engagement with the fixed shoe. Furthermore, it provides adjustments in each shoe to ensure flat contact of the two cooperating shoes.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In a press for applying heat and pressure to a flexible sheet material, a fixed lower platen and an upper platen mounted for vertical movement relative to the lower platen from an upper inoperative position to a lower operative position in cooperative association with said lower platen, said platens being of elongated form having cooperating flat faces and the lower platen having exposed edges, a frame for fitting around said exposed edges of the lower platen so that it will overlap the sheet of material when it is positioned thereon and will pull its edges down over the exposed edges of said platen to locate and hold the sheet material thereon in engagement with the flat face thereof, and means for mounting the frame for movement into and out of cooperative relationship with said lower platen.

2. The combination of claim 1 in which said means comprises means for supporting the frame between said platens for engagement by the upper platen upon downward movement thereof and including means for moving the frame upwardly away from the lower platen upon upward movement of the upper platen.

3. The combination of claim 2 in which said last-named means comprises means for supporting the frame for swinging movement between the two platens.

4. The combination of claim 3 including counterbalance means for automatically raising the frame upon upward movement of said upper platen.

5. The combination of claim 2 comprising safety switch for controlling downward movement of the upper platen relative to the lower platen, and stop units for limiting downward movement of said upper platen relative to the lower platen, and means for actuating said switches and simultaneously releasing said stop units.

6. The combination of claim 5 in which the platens are elongated and are supported on an elongated frame, said actuating means comprising a pair of actuating elements, one of said elements being located toward each end of said frame.

7. The combination of claim 6 in which the movable upper platen is supported on a carriage mounted for vertical movement on said frame, said stop units each comprising a stop on the frame and a cooperating stop on the carriage, said actuating elements being connected to the stops on the frame for moving them out of the paths of the stops carried by the carriage.

8. The combination of claim 2 in which the upper platen is mounted on a carriage, a supporting frame for the carriage for supporting it for vertical movement, guide means carried by the supporting frame for guiding the carriage in its vertical movement, and means at each end of the carriage for ensuring that both ends of the carriage will travel vertically the same extent.

9. The combination of claim 8 in which said last-named means comprises a horizontal shaft rotatably carried by the carriage and having rack gears keyed thereon adjacent each end of the carriage, and vertical racks carried by the frame adjacent the ends of the carriage.

10. The combination of claim 9 including support plates carrying each of the platens, and leveling screws between the plates and the platens for accurately leveling the platens.

11. In a press for applying heat and pressure to a flexible sheet material, a fixed lower platen and an upper platen mounted for vertical movement relative to the lower platen from an upper inoperative position to a lower operative position in cooperative association with said lower platen, said platens being of elongated form having cooperating flat faces and the lower platen having exposed edges, a frame for fitting around said exposed edges of the lower platen to locate and hold the sheet material thereon in engagement with the flat face thereof, means for mounting the frame for movement into and out of cooperative relationship with said lower platen, said means comprising means for supporting the frame between said platens for engagement by the upper platen upon downward movement thereof and including means for moving the frame upwardly away from the lower platen upon upward movement of the upper platen, said frame comprising front and rear sections hinged together, said lower platen being supported by a flat plate, and said frame engaging the plate when fitting around said lower platen.

12. The combination of claim 11 in which the lower platen is of rectangular form and the frame is of similar form and snugly fits around the lower platen.

13. In a press for applying heat and pressure to a flexible sheet material, a fixed lower platen and an upper platen mounted for vertical movement relative to the lower platen from an upper inoperative position to a lower operative position in cooperative association with said lower platen, said platens being of elongated form having cooperating flat faces and the lower platen having exposed edges, a frame for fitting around said exposed edges of the lower platen to locate and hold the sheet material thereon in engagement with the flat face thereof, means for mounting the frame for movement into and out of cooperative relationship with said lower platen, said means comprising means for supporting the frame between said platens for engagement by the upper platen upon downward movement thereof and including means for moving the frame upwardly away from the lower platen upon upward movement of the upper platen, said lower platen being supported by a flat plate, and said frame engaging the plate when fitting around said lower platen.

14. The combination of claim 13 in which the lower platen is of rectangular form and the frame is of similar form and snugly fits around the lower platen.

15. In a press for applying heat and pressure to a flexible material for sealing an overlapping seam therein which extends along an arcuate line in the material, relatively movable flat platens for receiving the material therebetween and exerting pressure thereon during heating, at least one of said platens having exposed edges, a frame mounted for movement from a position where it is spaced from said latter platen to a position where it fits around the exposed edges of such platen so that when the material is thereon, the frame will overlap the material and pull its edges over the exposed edges of the platen to position and hold the seam in flat contact therewith, and means for mounting the frame for movement into and out of cooperative relationship with said latter platen.

References Cited in the file of this patent

UNITED STATES PATENTS

| | | |
|---|---|---|
| 2,065,820 | Mellon | Dec. 29, 1936 |
| 2,390,550 | Moore | Dec. 11, 1945 |
| 2,405,640 | Cannon | Aug. 13, 1946 |
| 2,521,282 | Butler | Sept. 5, 1950 |
| 2,603,145 | Dreis | July 15, 1952 |
| 2,638,964 | Andina | May 19, 1953 |

FOREIGN PATENTS

| | | |
|---|---|---|
| 697,466 | Great Britain | Sept. 23, 1953 |